United States Patent [19]
Binger et al.

[11] 3,751,626
[45] Aug. 7, 1973

[54] RESISTANCE WELDING OF ALUMINUM

[75] Inventors: Wayne W. Binger, New Kensington; Walter G. Zelley, Lower Burrell; Fred R. Hoch, Lower Burrell; Paul B. Dickerson, Lower Burrell, all of Pa.

[73] Assignee: Aluminum Company of America, Pittsburgh, Pa.

[22] Filed: Dec. 17, 1971

[21] Appl. No.: 209,396

[52] U.S. Cl. ............................................. 219/118
[51] Int. Cl. .......................................... B23k 11/16
[58] Field of Search ................. 219/117 R, 118, 91, 219/86

[56] References Cited
UNITED STATES PATENTS

| | | | |
|---|---|---|---|
| 2,977,458 | 3/1961 | Tournaire et al. ................ | 219/91 X |
| 3,584,187 | 6/1971 | Majetich .......................... | 219/118 X |
| 3,378,668 | 4/1968 | Dolomont ........................ | 219/118 X |
| 1,511,194 | 10/1924 | Austin .............................. | 219/118 X |
| 3,391,033 | 7/1968 | Chevigny et al. ................ | 148/6.27 |
| 3,196,247 | 7/1965 | Piercy et al. .................... | 219/72 |

*Primary Examiner*—J. V. Truhe
*Assistant Examiner*—Gale R. Peterson
*Attorney*—Carl R. Lippert

[57] ABSTRACT

Resistance welding such as spot welding of aluminum sheets and the like is greatly enhanced by the provision of a reacted silicate coating which substantially extends the useful life of welding electrodes by reducing pickup of aluminum on the electrode.

9 Claims, No Drawings

RESISTANCE WELDING OF ALUMINUM

BACKGROUND OF THE INVENTION

In the resistance welding of aluminum one serious problem encountered is metal transfer from the aluminum members which are often members to the electrode tips used in the resistance welding. For instance, in spot welding of aluminum sheets electrode tips can become sufficiently fouled by aluminum pickup after only 100 welds that excessively low strength welds result. This greatly curtails welding operations especially in a mass production facility such as that which might be used in the fabrication of a coach or body for an automobile or truck. Various attempts have been made to extend the period before which welding must be interrupted to clean or replace the welding electrodes but these have proven unsatisfactory for one reason or another and the problem of short electrode life continues to obstruct efforts to mass produce spot welded aluminum sheet structures.

It has long been considered of critical importance in spot welding of aluminum that the surface resistance of the sheets being joined be as low as possible. Throughout the welding industry a maximum surface contact resistance of 50 microhms between sheets being joined has been considered highly desirable to achieve the best welds. Accordingly, a number of cleaning procedures were developed to remove the oxide film and thus reduce joint surface contact resistance to as little as 20 microhms or even less. However, even after these sometimes painstakingly careful procedures, spot welding operations are plagued by recurrent electrode tip fouling caused by pickup on the electrodes of aluminum from the pieces being joined. Some have spoken of protective coatings which hopefully preserve an initially achieved low surface contact resistance characteristic, but these coatings themselves are normally chosen to provide very low surface resistance levels. Nonetheless, to date there still remains a strong need for a reliable solution to the electrode fouling problem.

STATEMENT OF THE INVENTION

In accordance with the present invention the problem of electrode fouling in spot and other resistance welding of aluminum is alleviated to a marked extent thereby providing electrode foul-free spot welding for extended periods of up to 1,500 welds and even more before the electrode tips require cleaning. This improvement is effected by providing the aluminum members being joined with a reacted silicate coating. Surprisingly this coating greatly alleviates the electrode fouling problem, notwithstanding the fact that the silicate coating can effect a joint surface contact resistance as high as 20,000 microhms and even higher. The silicate coating can be provided by immersing the aluminum in a bath of an aqueous solution of an alkali metal silicate. Cleaning is not absolutely necessary before the coating is applied although it is sometimes preferred.

DETAILED DESCRIPTION

The aluminum members being joined, suitably termed the parent members, may be made up of substantially pure aluminum or any of the known alloys containing 70 percent or more aluminum commonly known as aluminum alloys. Typically the alloys contain varying amounts of up to 10 percent zinc, up to 10 percent magnesium, up to 10 percent copper, up to 3 percent manganese and up to 0.5 percent chromium with varying amounts of iron and silicon such as up to several percent Si and up to a few percent Fe. Obviously other elements can be included as is widely appreciated in the art. The particular alloys being joined can be identical or they can be different aluminum alloys. The alloy members being joined are most often sheet members although extruded members and other wrought members and to a lesser extent even some cast members can be joined by resistance welding with substantial improvement by the practice of the invention. For the most part resistance welding is useful on aluminum sheet and other product thickness levels of up to ⅛ inch and sometimes higher, even up to ¼ inch although most spot welding is done on sheet members ranging in thickness from 0.016 to 0.125 inch.

The resistance welding processes herein referred to are those wherein permanent or nonconsumable electrodes typically are employed to conduct electrical current across the electrode spacing and through the lapped sheet or other parent members positioned in joining relationship at a joint site which space the electrodes. Normally a significant amount of force is applied between the electrodes so that the aluminum sheet members are under compressive forces. The compressive forces can be varied during spot welding such that once solidification starts to occur the force can be increased to slightly forge the weld to improve its physical properties. The pressure is typically 600 to 1,000 pounds although it can vary from 300 to 3,000 pounds. Sufficient electric current is passed between the electrodes and through the joint site to cause local fusion in the parent members to produce a weld nugget which reflects a weld penetration of typically 20 to 80 percent of the total joint thickness. Higher electric current levels favor greater penetration. Typically electrical current levels of 10,000 to 80,000 amps are employed at voltage levels of 2 to 20 volts. The electrode tips, usually copper, are normally about ⅝ inch in diameter and provided with a 3 inch spherical radius at the end which contacts the aluminum workpieces although the practice of the invention contemplates various different electrode tip configurations and sizes. In fact certain electrode tip configuratons are often preferable for certain sheet thicknesses as is illustrated in the table set out below which lists the electrode face spherical radius for 5/8 inch diameter electrodes against typical metal thickness.

| Thickness, inch | Radius, inches |
| --- | --- |
| 0.016 | 1 |
| 0.025 | 2 |
| 0.040 | 3 |
| 0.072 | 4 |
| 0.091 | 6 |
| 0.125 | 6 |

In addition to spot welding as such the invention is useful in seam welding, or roller spot welding, where the electrodes are wheels normally varying from about 6 to 24 inches. Current is applied at intervals which can be adjusted so that the spots overlap to provide a continuous pressure-tight seam.

The aluminum workpieces typically sheets, are treated in accordance with generally known procedures to impart thereto a reacted silicate coating employing immersion in a bath containing soluble silicates, for instance an aqueous bath containing an alkali metal silicate. These baths are generally known in the coating arts but their usefulness in improving resistance welding operations has not been previously recognized. Of the alkali metal silicates, sodium silicate is preferred since it is the least expensive and most readily available. Since it is readily soluble in water the desired solutions are easily prepared and are reasonably stable. The bath preferably contains at least 0.1 percent by weight of anhydrous alkali metal silicate, such as sodium silicate. A concentration of 3–5 percent is convenient to use in production. Higher concentrations can also be employed but they would increase the costs. It is also preferred that the silicate have a $SiO_2:Na_2O$ ratio of 3:1 or greater, but in no event should the ratio go below 1:1. The bath temperature may vary from 140°F to boiling although temperatures of over 150°F are recommended and a temperature of about 180°F is preferred. The immersion time varies inversely with temperature but generally an immersion of at least 15 seconds is desired. For instance an immersion of 20 seconds in a bath containing 5 percent sodium silicate at a temperature of 160°–180°F is highly satisfactory. The silicate coating can be applied to one or both sides of the aluminum member and need be applied only in the weld areas although complete coating is usually more convenient and facilitates welding at any site. While the alkali metal (Na, K and Li) silicates, especially sodium silicate, are preferred, it is believed other silicates may be operative such as ammonium silicates, to the extent they may be available, and possibly alkaline earth silicates if suitable bath conditions are provided.

The silicate treatment imparts a reacted silicate coating rather than a precipitated which means that the coating is the product of the reaction between the aluminum member and the silicate bath. The coating is difficult to describe in exact terms but it is believed to be a reacted silicate coating and is non-metallic, perhaps loosely describable as an aluminum silicate. The coating is thin, continuous and adherent and will not flake off on bending or flexing. In general its thickness is less than 0.00003 inch and it is usually greater than 100 angstroms, normally on the order of 1,000 angstroms. The silicate coating contains aluminum and at least 0.7 percent silicon, and generally around 1 percent silicon, regardless of the silicon content of the aluminum metal substrate, and can be considered as some form of aluminum silicate. Where the coating is greater than 1,000 angstroms in thickness, its outer 1,000 angstroms contain the above-specified minimal amount of silicon. The above-stated thicknesses vary somewhat from most chemical conversion coatings which usually exceed 0.00003 inch in thickness but nonetheless are effective for the purposes here sought. One way of measuring the silicon content is by use of an electron microprobe. Employing this device, electrons contact the surface coating of silicate penetrating somewhat into that surface and causing X-rays to be emitted from the layer penetrated. Intensity of the X-ray wave length for silicon is indicative of the silicon concentration.

It is especially interesting in connection with the silicate coating that its electrical resistance is much higher than that normally sought for surface conditions on aluminum members to be spot welded. As indicated earlier, the art has continuously sought low surface resistance levels and the present provision of a coating which has a relatively high surface resistance which nonetheless greatly improves resistance welding was completely surprising. Typical joint surface contact resistance levels of aluminum coated with silicate as provided herein range from around 1,000 to 100,000 microhms which contrasts markedly with previous sought levels of 50 microhms or less. While it is believed that the increased surface resistance itself has no direct bearing on the improved welding characteristics it is significant to note that the coating with its relatively high surface resistance is highly incompatible with previous thinking in the welding art. While only those portions of the members being joined which actually contact the weld electrodes need be coated, the invention contemplates coating substantially all of the surface on each side and on each member being joined since such is very suited to production coating techniques.

As indicated earlier it is not absolutely essential that the aluminum members be cleaned prior to the silicate treatment. The silicate treatment can, in fact, be applied to the as fabricated metal surface after only degreasing in a solvent such as alcohol, acetone or ketone. The lubricant film left on the member in fabrication, should be removed from the metal surface to provide a uniform and continuous silicate coating formation. Accordingly its removal is strongly recommended prior to rather than in the coating operation itself. It is not absolutely essential that the oxide coating be removed prior to the silicate treatment and many of the advantages of the invention are achieved without any special precleaning beyond degreasing or removal of rolling or other fabricating lubricants. However, optimum performance and consistently best results recommend some surface treatment prior to the silicate treatment in order to assure a uniform silicate film development among other things.

Accordingly the invention contemplates the preferred use of alkaline or acid treatments as generally employed in the art to remove the oxide film. On nonheat treated alloys, mildly etching alkaline cleaners will usually be sufficient to remove soil and oxide to a level that the surface will respond readily to the silicate film formation. With some heat treated alloys, however, the thermally formed oxide is heavy and resistant. In such cases, it may be desirable to employ an acid deoxidizing treatment prior to entering the silicate solution. Acid deoxidizing treatments are effective because they have a relatively high rate of dissolution on oxide and a relatively low rate of attack on the substrate.

When resistance welding the silicate coated sheet relatively standard procedures are employed. It is important that where only one face of an aluminum parent member is coated with the reacted silicate that face should be in contact with the welding electrode. In welding the parents are simply brought into lapped joining position and the electrodes pressed against the opposite faces. When current is applied, the weld is effected.

As an illustration of the present improvement sheet members of 5052 aluminum alloy containing nominally 2.5% Mg and 0.25 percent chromium about 0.064 inch thick were spot welded to compare the improvement with the standard practices. In the comparison the sheet was cleaned with a mild alkaline cleaner to remove lubricant and soil and then spot welded to determine the number of welds which could be made before the electrode tips needed cleaned. The uncoated sheet provided a joint surface resistance of well under 50 microhms but only 100 welds could be made before the spot welding electrode tips became fouled by metal pickup from the aluminum sheet. This fouling resulted in inadequate weld strength. Comparison sheets were treated in accordance with the invention by immersion for 20 seconds in a 5 percent sodium silicate bath at a temperature of about 170°F. The sodium silicate had a silica to soda ratio of greater than 3:1. The specially treated sheet enabled the production of more than 1,500 welds before the electrodes were considered excessively fouled so as to interfere with weld soundness.

While the invention has been described in terms of preferred embodiments, the claims appended hereto are intended to encompass all embodiments which fall within the spirit of the invention.

What is claimed is:

1. An improved resistance welding process for joining members of aluminum or aluminum alloys comprising:
   1. providing said members having at least a portion coated with a reacted silicate coating,
   2. bringing said members into resistance joining relationship with the silicate coated portion situated so as to contact at least one of the resistance welding electrodes,
   3. bringing said resistance welding electrodes into forced contact with said portion,
   4. passing sufficient electric current between said electrodes and through said joint site to locally fuse said sheet members together to provide a resistance welded joint.

2. The method according to claim 1 wherein said parent members are sheet members at least one surface of which sheet member is provided with a coating substantially all over said surface.

3. The method according to claim 1 wherein said resistance welding process is a spot welding process.

4. The method according to claim 1 wherein said silicate coating is from 100 angstroms to 0.00003 inch in thickness.

5. The method according to claim 1 wherein said silicate coating is such that the outer 1,000 angstroms of metal surface has a silicon content of at least 0.7 percent.

6. The method according to claim 1 wherein said members are sheet members each having substantially its entire surface on both sides coated with said coating.

7. An improved resistance welding process for joining sheet members of aluminum or aluminum alloys comprising:
   1. providing said sheet members having both surfaces thereof substantially completely coated with a reacted silicate coating,
   2. bringing said members into lapped contact resistance welding joining relationship at a joint site,
   3. bringing resistance welding electrodes into forced contact with at least a portion of said members at said joint site, and
   4. passing sufficient electric current between said electrodes and through said joint site to locally fuse said sheet members together to provide a resistance welded joint.

8. The method according to claim 7 wherein said reacted silicate coating is from 100 angstroms to 0.00003 inch in thickness.

9. The method according to claim 7 wherein said silicate coating is such that the outer 1,000 angstroms of metal surface has a silicon content of at least 0.7 percent.

* * * * *

UNITED STATES PATENT OFFICE
CERTIFICATE OF CORRECTION

Patent No. 3,751,626      Dated August 7, 1973

Inventor(s) Wayne W. Binger, Walter G. Zelley, Fred R. Hoch and Paul B. Dickerson It is certified that error appears in the above-identified patent and that said Letters Patent are hereby corrected as shown below:

In the Claims, add the following claim:

--10. In the method of resistance welding to join members of aluminum or aluminum alloys wherein said members are brought into resistance joining relationship and resistance welding electrodes are brought into forced contact with surface portions of said members and sufficient electric current is passed between said electrodes and through the joint site to locally fuse said members together to provide a resistance welding joint, the improvement wherein said surface portions of said members are provided with a reacted silicate coating.--

On the cover page "9 Claims, No Drawings" should read --10 Claims, No Drawings--.

Signed and sealed this 25th day of December 1973.

(SEAL)
Attest:

EDWARD M. FLETCHER, JR.      RENE D. TEGTMEYER
Attesting Officer      Acting Commissioner of Patents